United States Patent
Fuchs

(10) Patent No.: US 8,646,495 B2
(45) Date of Patent: Feb. 11, 2014

(54) FUEL TANK FOR MOTOR VEHICLES WITH FILLING LEVEL LIMITING DEVICE

(75) Inventor: Thomas Fuchs, Sinabelkirchen (AT)

(73) Assignee: MAGNA STEYR Fuel Systems GesembH, Sinabelkirchen (AT)

( * ) Notice: Subject to any disclaimer, the term of this patent is extended or adjusted under 35 U.S.C. 154(b) by 633 days.

(21) Appl. No.: 12/359,578

(22) Filed: Jan. 26, 2009

(65) Prior Publication Data

US 2009/0194195 A1    Aug. 6, 2009

(30) Foreign Application Priority Data

Jan. 24, 2008   (DE) .......................... 10 2008 005 975

(51) Int. Cl.
*B65B 1/30* (2006.01)

(52) U.S. Cl.
USPC ........... 141/198; 141/201; 141/211; 141/212; 141/213; 141/214; 141/215; 141/216; 141/217; 141/218; 141/223; 141/229; 141/301; 137/417; 137/423

(58) Field of Classification Search
USPC ......... 141/198, 201, 211–218, 223, 229, 301, 141/86.2; 137/409, 592, 417, 420, 421, 137/423; 220/86.2

See application file for complete search history.

(56) References Cited

U.S. PATENT DOCUMENTS

| | | | | |
|---|---|---|---|---|
| 2,320,457 A * | 6/1943 | Hammell | ...................... | 137/400 |
| 5,205,319 A * | 4/1993 | Chiang | ........................ | 137/423 |
| 5,950,692 A * | 9/1999 | Georgs et al. | ................. | 141/198 |
| 6,293,302 B1 * | 9/2001 | Waters et al. | ................. | 137/390 |
| 2006/0185758 A1 * | 8/2006 | Kuo | .............................. | 141/198 |

* cited by examiner

*Primary Examiner* — Jason J Boeckmann
*Assistant Examiner* — Joel Zhou
(74) *Attorney, Agent, or Firm* — Bachman & LaPointe, P.C.

(57) ABSTRACT

A fuel tank for vehicles has a filler tube and a filling level limiting device, with the filler tube comprising, in the interior of the fuel tank, a closing device which interacts with an actuating device which is composed of:

a) a frame which is fastened in the interior of the fuel tank and which has a force store which actuates the closing device;
b) a locking arrangement which holds the force store in the stressed state;
c) a release mechanism which is operatively connected to a float; and
d) a stressing mechanism for stressing the force store.

The actuating device ensures that a flap closes precisely when a nominal filling level is reached, and does not open again even under intense fluctuation of the liquid level.

9 Claims, 3 Drawing Sheets

FUEL TANK FOR MOTOR VEHICLES WITH FILLING LEVEL LIMITING DEVICE

BACKGROUND OF THE INVENTION

The invention relates to a fuel tank for vehicles having a filler tube and having a filling level limiting device, with the filler tube comprising, in the interior of the fuel tank, a closing device which interacts with an actuating device. The filling level limiting device is intended to ensure that the filling device shuts down in the event of a build-up of a counter pressure, and to thereby prevent overfilling of the fuel tank. In the presence of a ventilation system, the build up of a sufficient counter pressure is not ensured and it is imperatively necessary to prevent an infiltration of fuel into the activated carbon filter as a result of overfilling.

In conventional fuel tanks, as a filling level limiting device, provision is made of a float which is directly coupled to a flap in the filler pipe. This is unsatisfactory since the float closes the flap to the extent to which the liquid level in the tank rises, and since the liquid level is unsettled during the tank filling process. This may result in the flap briefly opening again after closing, and thereby delaying the shutdown. Furthermore, such systems may only be used if the filler tube opens out into the tank at the height of the filling level.

U.S. Pat. No. 5,950,692 discloses a filling level limiting device in which the float is connected via a lost motion device to a flap which closes in the flow direction. In this way, the flap remains fully open during the filling process and closes abruptly when the nominal filling level is reached. The lost motion is also intended to prevent the flap opening again in the event of a fluctuation of the filling level once it has closed. That and the degree of sealing of the flap is however determined, in the limited range of the lost motion, only by the pressure upstream of the flap, and is therefore unreliable. The abrupt closure of the flap leads to a massive overflow outward during a tank filling process with a fully open filling nozzle. Additional damping would further increase the risk of the flap not opening as the liquid level falls.

It is therefore the object of the invention to create a filling level limiting device which closes quickly, but not abruptly, precisely when the nominal filling level is reached, and then reliably does not open again even under intense fluctuation of the liquid level. It is occasionally also desirable for the closing device to be actuated by remote control and to permit re-filling of the tank even after a small amount of fuel has been extracted.

SUMMARY OF THE INVENTION

The foregoing object is achieved by the present invention by providing a fuel tank for vehicles comprising a filler tube having a portion located within the tank, a filling level limiting device located within the tank, a closing device for the filler tube which interacts with an actuating device, the actuating device comprising: a) a frame fastened in the interior of the fuel tank and a force store located in the frame which actuates the closing device; b) a locking arrangement which holds the force store in a stressed state; c) a release mechanism operatively connected to a float; and d) a stressing mechanism for stressing the force store for moving the closing device between an open position and a close position.

Since the closing device is actuated by a force store, for example a spring element (a pressure spring), the contact pressure and therefore the degree of sealing of the flap is independent of other influences. The locking arrangement ensures that the closing device initially remains fully open and is only closed by the spring element upon activation of the release mechanism. The float of the release mechanism need not exert any large force, and may therefore be of small design. Once the closure has been triggered, the float is decoupled. In this way, the closing device remains closed even under the most intense fluctuations of the liquid level until the spring element is stressed again by the stressing mechanism.

In one preferred embodiment, the spring element is a pressure spring which is supported with one end in the frame and with the other end on a piston which is guided in the frame. The piston is mechanically connected to the closing device and the locking arrangement engages into the piston. The piston ensures the function of the locking arrangement and is connected to the closing device and to the stressing mechanism.

The locking arrangement is preferably formed by a bar which can be pulled outward, transversely with respect to the movement direction of the piston, counter to the force of a further spring, which bar is pulled outward by the pivotable arm of the float when the nominal filling level is reached. A bar of said type may also be activated from outside the tank. In this way, the closing device can be closed by remote control even below the nominal filling level, and the tank filling process can thereby be ended early.

Within the context of the invention, there are two preferred approaches for the design of the stressing mechanism. The first approach involves a further float which is operatively connected to the piston in such a way as to stress the pressure spring, which serves as a force store, when the liquid level falls during driving operation. For this purpose, the float is preferably fastened to a pivotable lever which acts on the piston.

The other approach involves, as a stressing mechanism, a hydraulic cylinder which is acted on with propellant. The stressing piston of said hydraulic cylinder is operatively connected to the piston of the force store. The hydraulic cylinder makes it possible for the closing device to be opened, and for the spring to be stressed, at all times, such that it is possible to re-fill the tank again even shortly after the tank filling process.

In one preferred refinement, the propellant arrives from the injection device, or from the fuel pump which is accommodated in the fuel tank, via a return line. Since the engine must be shut down before a tank filling process, and the injection device or the fuel pump also start to operate as the engine is started up again, the closing device is automatically opened again without any intervention by the driver. For this purpose, the hydraulic cylinder has an outflow opening which the stressing piston releases after a stroke which corresponds to the locked position of the piston. The hydraulic cylinder may thus be easily installed into the already-existing return line without hindering the function of the latter.

Within the context of the invention, a wide variety of types of valves may be used as a closing device. It is however preferable for the closing device to be a flap valve which closes counter to the flow direction in the filler tube.

DETAILED DESCRIPTION

Figure 1:
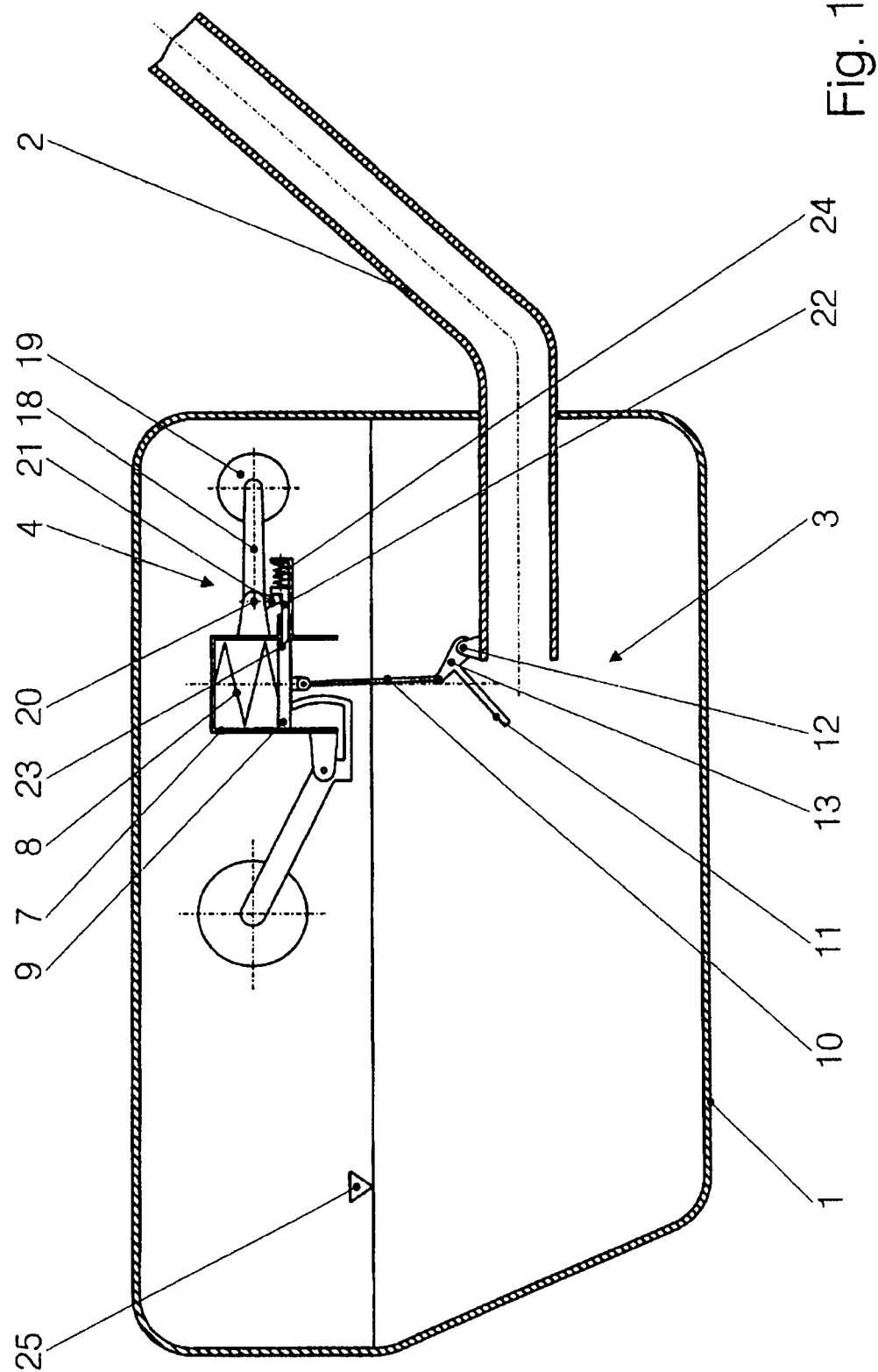
FIG. 1 shows a simplified illustration of a fuel tank according to the invention with the closing device open.

In FIG. 1, the fuel tank is denoted by 1 and the filler tube of said fuel tank 1 is denoted by 2. Said filler tube 2 opens out in the tank 1 and has, at its inner end, a closing device 3, in this case a flap valve. An actuating device 4 which acts on the closing device 3 is fitted in the interior of the fuel tank. The situation in FIG. 1 is the fuel tank only half-full during driving operation, as indicated by the liquid level 25.

The actuating device 4 is composed of a frame 7 or housing or the like, a piston 9 which is guided therein and which is supported in the housing by means of a spring element 8 (in this case a pressure spring), a locking arrangement, a release mechanism and a stressing mechanism. As a locking arrangement, a bar 22 which is guided in the frame 7 is movable outward, transversely with respect to the movement direction of the piston, counter to the force of a spring 24. A float 19 at the end of a two-armed lever which is pivotable about an axle 20 serves as a release mechanism. The other arm 21 forms, at approximately right angles, a pressure lug, by means of which the bar 22 is retracted once the liquid level 25 in the tank has reached the nominal level 26 indicated in FIG. 2.

In the position of FIG. 1, the bevelled end, which faces toward the piston, of the bar 22 engages into a recess 23 of the piston. The recess 23 is shaped such that the bar locks the piston but can be pulled out of said piston with little force. The end of the bar 22 is bevelled on its side facing away from the pressure spring 8, such that during the upward movement of the piston 9 generated by the stressing mechanism, said bar 22 is pushed backward counter to the spring 24 and then latches into the recess 23.

Figure 2:
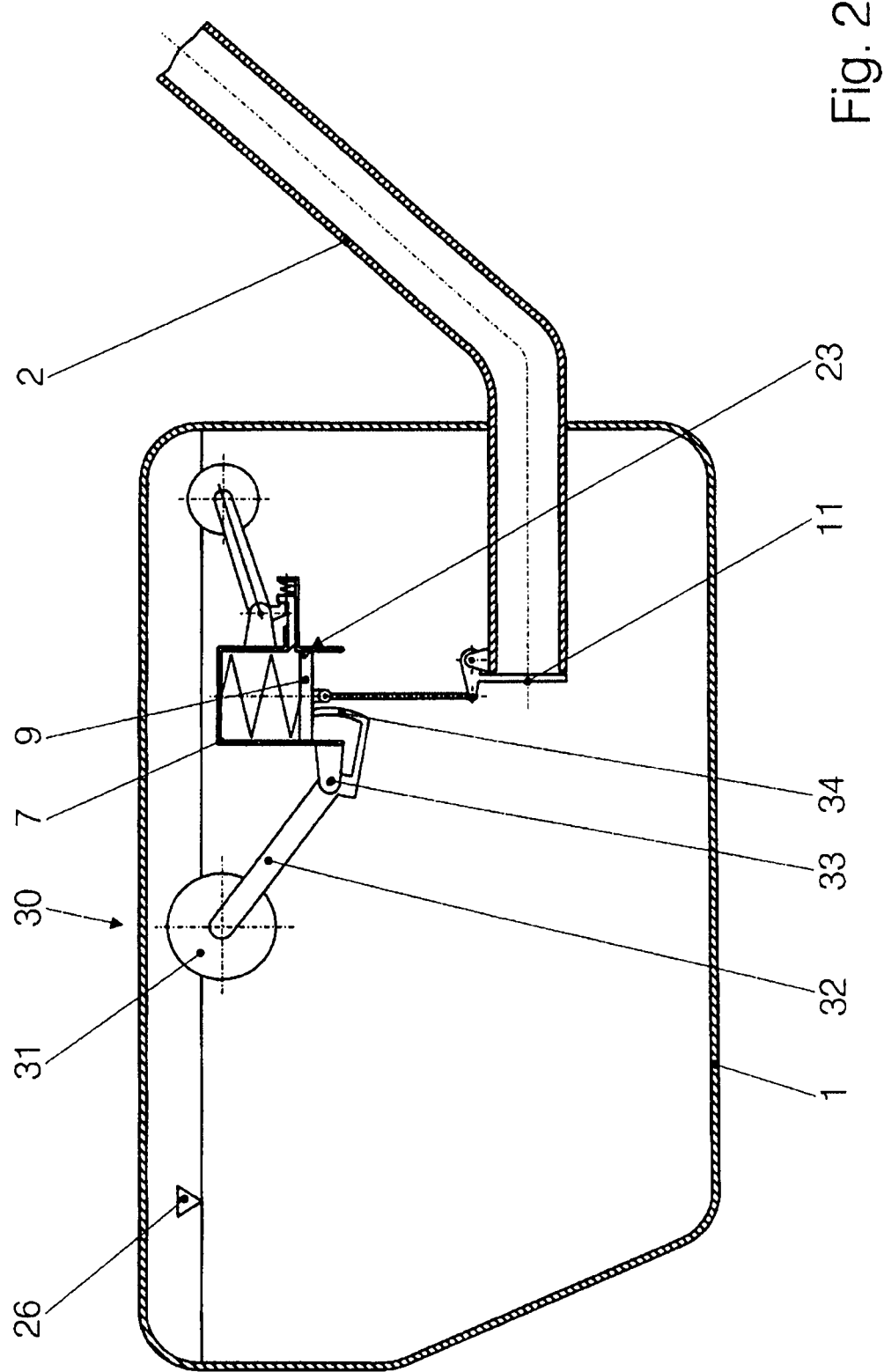
FIG. 2 shows the same as FIG. 1, but with the closing device closed.

A first embodiment of the stressing mechanism 30 is now described on the basis of FIG. 2, which shows the fuel tank fully filled and with the closing device closed: a further float 31 is fastened to the end of a two-armed lever 32 which is pivotable about an axle 33. The other arm 34 of the lever forms a pressure lug which acts on the piston 9. During driving operation, the liquid level slowly falls; in the process, the float likewise falls on account of its own weight, and thereby lifts the piston 9 until said piston 9 is fixedly held by the bar 22.

Figure 3:
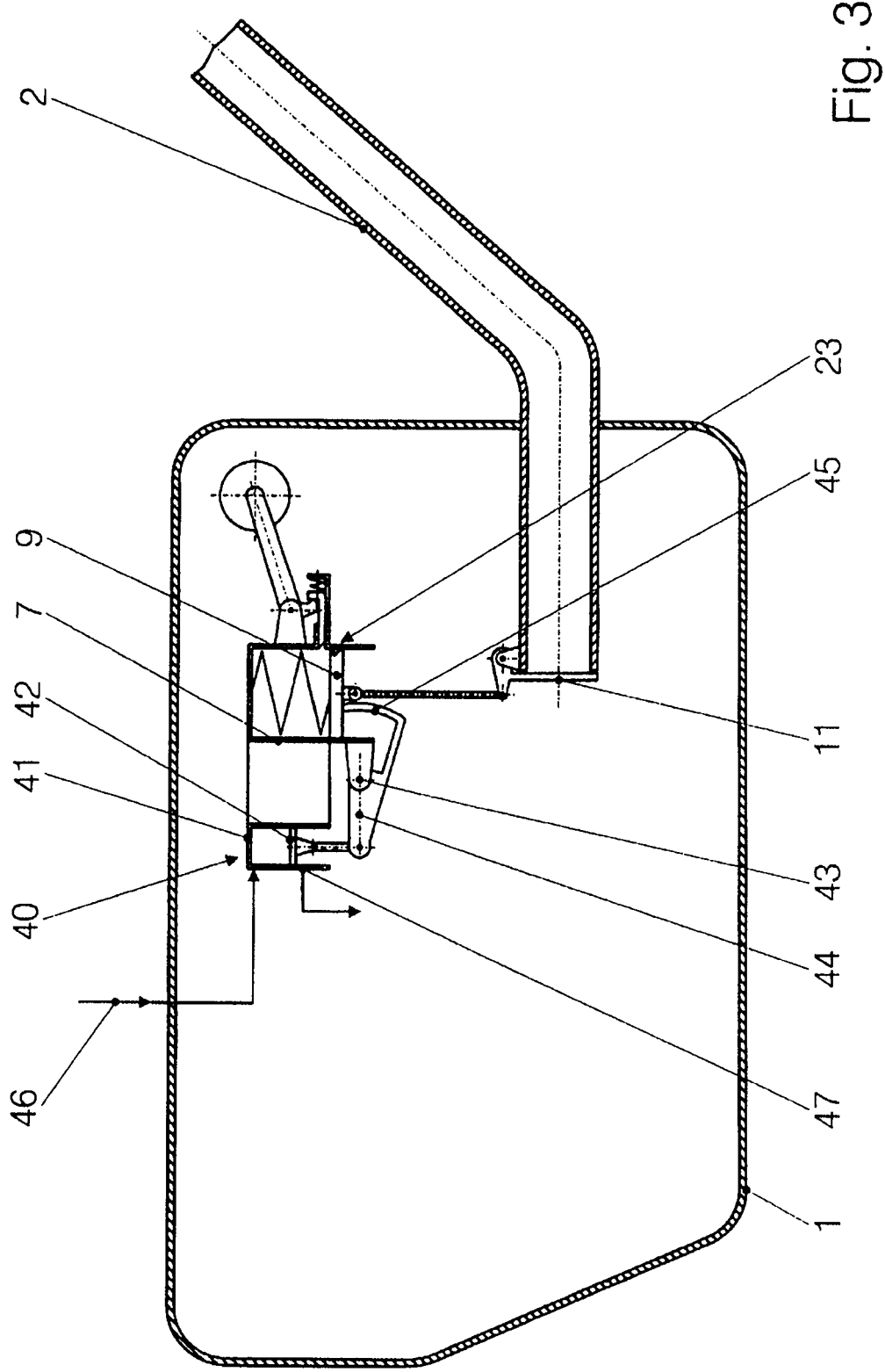
FIG. 3 shows a variant of FIG. 1.

A second embodiment of the stressing mechanism 40 is described below on the basis of FIG. 3: instead of the further float, provision is made here of a hydraulic cylinder 41, the piston 42 of which acts via a lever 44 on the piston 9. The lever is of two-armed design and is pivotable about an axle 43 on the frame 7; that arm 45 of said lever 44 which acts on the piston 9 forms a pressure lug 45.

Here, a return line 46 from the propellant pump (not illustrated) which is present in any case is guided firstly into the interior of the hydraulic cylinder 41 and can leave the latter again through an outlet opening 47. Since the engine, and therefore also its auxiliary assemblies, are at a standstill during the tank filling process, the hydraulic cylinder is also unpressurized. Said hydraulic cylinder does not hinder the downward movement of the piston 9 once the nominal filling level is reached. When the engine is then started up again, a pressure is generated in the return line 46, by means of which the stressing piston 42 moves the piston 9 upward counter to the force of the pressure spring 8 and opens the flap 11. If it is to be made possible to fill the tank of the vehicle while the engine is running, it is necessary to provide a valve in the return line, which valve can be activated by means of a logical connection, for example to an outer tank flap, and/or by remote control.

The invention claimed is:

1. A fuel tank for vehicles comprising a filler tube having a portion located within the tank, a filling level limiting device located within the tank, a closing device comprising a flap valve for the filler tube which interacts with an actuating device, the actuating device comprising:
   a) a frame fastened in the interior of the fuel tank and a force store located in the frame for urging the closing device to a closed position;
   b) a locking arrangement guided in the frame which holds the force store in a stressed state when the closing device is in an open position;
   c) a release mechanism operatively connected to a float for releasing the locking arrangement and the force store for urging the closing device to the closed position; and
   d) a stressing mechanism for stressing the force store for moving the closing device between a closed position and an open position; and
   e) the force store comprises a spring element, the spring element comprises a pressure spring which is supported with one end in the frame and the other end on a piston, the piston is guided in the frame and is mechanically connected to the closing device, wherein the locking arrangement engages the piston.

2. A fuel tank for vehicles comprising a filler tube having a portion located within the tank, a filling level limiting device located within the tank, a closing device for the filler tube which interacts with an actuating device, the actuating device comprising:
   a) a frame fastened in the interior of the fuel tank and a force store located in the frame which actuates the closing device wherein the force store comprises a spring element comprising a pressure spring which is supported with one end in the frame and the other end on a piston, the piston is guided in the frame and is mechanically connected to the closing device, wherein the locking arrangement engages the piston;
   b) a locking arrangement which holds the force store in a stressed state, the locking arrangement comprises a bar which is movable transversely with respect to a movement direction of the piston, in opposition to the force of a further spring, wherein an arm, which is pivotable on the frame, is attached to a float, the arm is movable to pull the bar outward for releasing the piston when a nominal filling level is reached in the tank;
   c) a release mechanism operatively connected to the float; and
   d) a stressing mechanism for stressing the force store for moving the closing device between an open position and a close position.

3. A fuel tank according to claim 1, wherein the locking arrangement comprises a bar which is movable transversely with respect to a movement direction of the piston, in opposition to the force of a further spring, wherein an arm, which is pivotable on the frame, is attached to the float, the arm is movable to pull the bar outward for releasing the piston when a nominal filling level is reached in the tank.

4. A fuel tank according to one of claims 1 or 2, wherein a further float is provided as a stressing mechanism, wherein the further float is operatively connected to the piston to stress the pressure spring, which serves as a force store, when liquid level falls.

5. A fuel tank according to claim 4, wherein the further float is fastened to a lever which is pivotably mounted on the frame and which acts on the piston.

6. A fuel tank according to one of claims 1 or 2, wherein the stressing mechanism comprises a hydraulic cylinder which is acted on with a propellant and includes a stressing piston which is operatively connected to the piston of the force store.

7. A fuel tank according to claim 6, wherein the propellant is delivered from a fuel pump via a return line, wherein the hydraulic cylinder has an outflow opening which the stressing piston releases after a stroke which corresponds to a locked position of the piston.

8. A fuel tank according to claim 7, wherein the stressing piston is operatively connected to the piston via a further lever which is mounted on the frame.

9. A fuel tank according to claim 2, wherein the closing device comprises a flap valve.

* * * * *